(12) United States Patent
Higgins

(10) Patent No.: US 6,180,002 B1
(45) Date of Patent: Jan. 30, 2001

(54) FILTER PRESS WITH ALTERNATING DIAPHRAGM SQUEEZE CHAMBER PLATES AND FILTRATION CHAMBER PLATES

(75) Inventor: David M. Higgins, Holland, MI (US)

(73) Assignee: United States Filter Corporation, Palm Desert, CA (US)

( * ) Notice: Under 35 U.S.C. 154(b), the term of this patent shall be extended for 0 days.

(21) Appl. No.: 09/128,190

(22) Filed: Aug. 3, 1998

(51) Int. Cl.⁷ .................................. B01D 25/168

(52) U.S. Cl. .................. 210/185; 210/231; 210/350; 100/211

(58) Field of Search .................... 210/185, 227, 210/228, 229, 231, 350, 224; 100/211

(56) References Cited

U.S. PATENT DOCUMENTS

| | | |
|---|---|---|
| 1,049,715 | 1/1913 | Hopkins et al. . |
| 1,377,022 | 5/1921 | Naugle . |
| 2,431,496 | 11/1947 | Natelson et al. . |
| 2,991,884 | 7/1961 | Schackmann et al. . |
| 3,186,103 | 6/1965 | Burton . |
| 4,116,831 | 9/1978 | Keat . |
| 4,207,189 * | 6/1980 | Geuenich .................. 210/227 |
| 4,346,003 | 8/1982 | Polyakov et al. . |
| 4,620,373 | 11/1986 | Laskowski et al. . |
| 4,721,040 * | 1/1988 | Mau .................. 100/211 |
| 4,722,789 | 2/1988 | Kupka . |
| 4,999,118 | 3/1991 | Beltchev . |
| 5,092,983 | 3/1992 | Eppig et al. . |
| 5,143,609 | 9/1992 | Beltchev . |
| 5,160,440 | 11/1992 | Mérai . |
| 5,185,084 | 2/1993 | Lapidus et al. . |
| 5,198,123 * | 3/1993 | Stover et al. .................. 210/228 |
| 5,558,773 | 9/1996 | Aigeldinger et al. . |
| 5,672,272 | 9/1997 | Baer . |

FOREIGN PATENT DOCUMENTS

| | | |
|---|---|---|
| 307 525 | 4/1929 | (GB) . |
| 488 280 | 8/1938 | (GB) . |
| 1123134 * | 8/1968 | (GB) .................. 210/231 |
| 2 258 621 | 4/1995 | (GB) . |
| WO 95/27550 | 10/1995 | (WO) . |
| WO 97/00171 | 1/1997 | (WO) . |

OTHER PUBLICATIONS

"The Revolutionary Dryvac Environmental Dewatering System" brochure, Dryvac Environmental, Richmond, California, (4 pages), Date Unknown.

"DryVac Environmental VACUUM SYSTEM" brochure, DryVac Co., Richmond, California, (1 page), Date Unknown.

D/L News, "Wow, What a Press", vol. 4, Issue, 3, Aug. 1995, DryVac Environmental, (2 pages), Date Unknown.

"Applying Dryvac Industrial Technology to Municipal Biosolids" article, DryVac Environmental, Rio Vista, California, (2 pages), Date Unknown.

"Filter Press Makes Dry Cakes Without Sludge Dryer", Finishers' Management, Mar. 1996, DryVac, Richmond, California, (1 page).

"J–Vap" brochure, JWI, Inc., Holland, Michigan, May 1996 (4 pages).

* cited by examiner

Primary Examiner—Matthew O. Savage
(74) Attorney, Agent, or Firm—Flynn, Thiel, Boutell & Tanis, P.C.

(57) ABSTRACT

A filter press and method for separating solids from a slurry. The filter press includes a plurality of plates which are held in a sealed and contacting relationship with one another to form a plate stack. The plate stack includes alternating diaphragm-type squeeze plates and cloth-type chamber plates whereby two adjacent plates form a filter chamber therebetween for filtering the slurry. The diaphragm-type squeeze plates include a thin liquid impermeable diaphragm or membrane having a uniform thickness for greater flexibility and heat transfer.

14 Claims, 9 Drawing Sheets

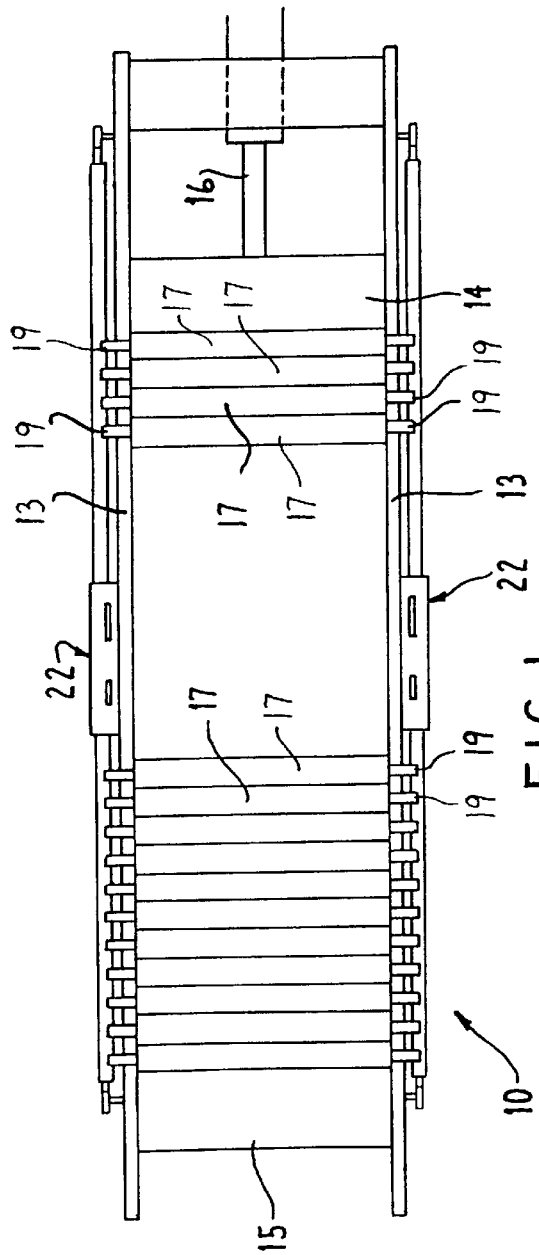
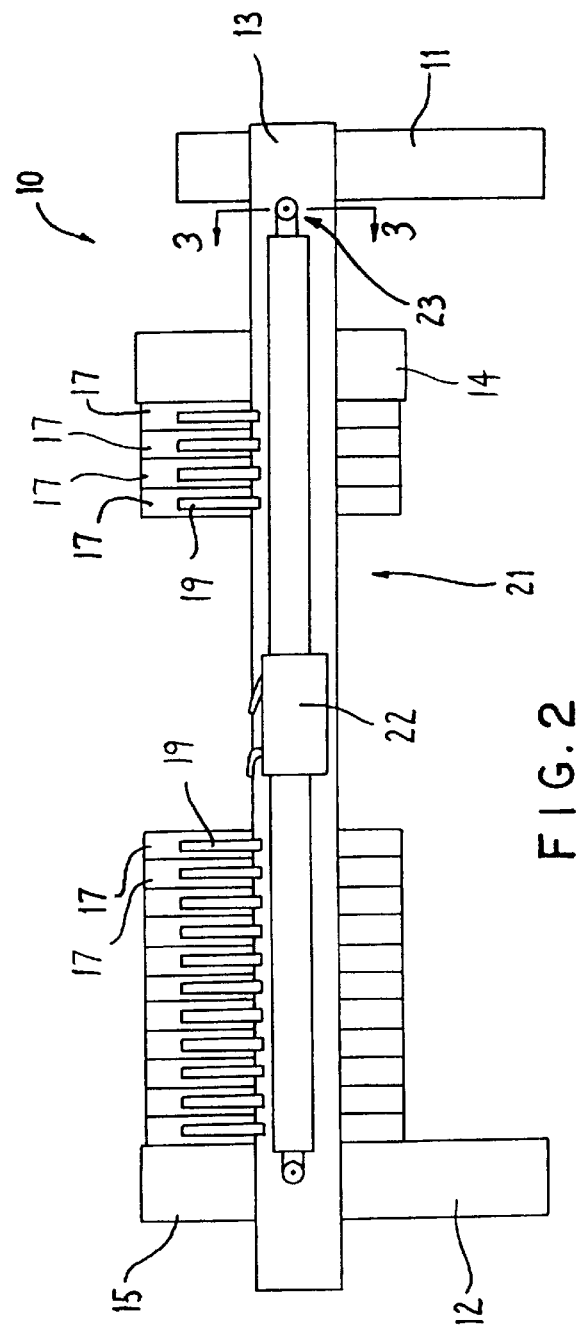

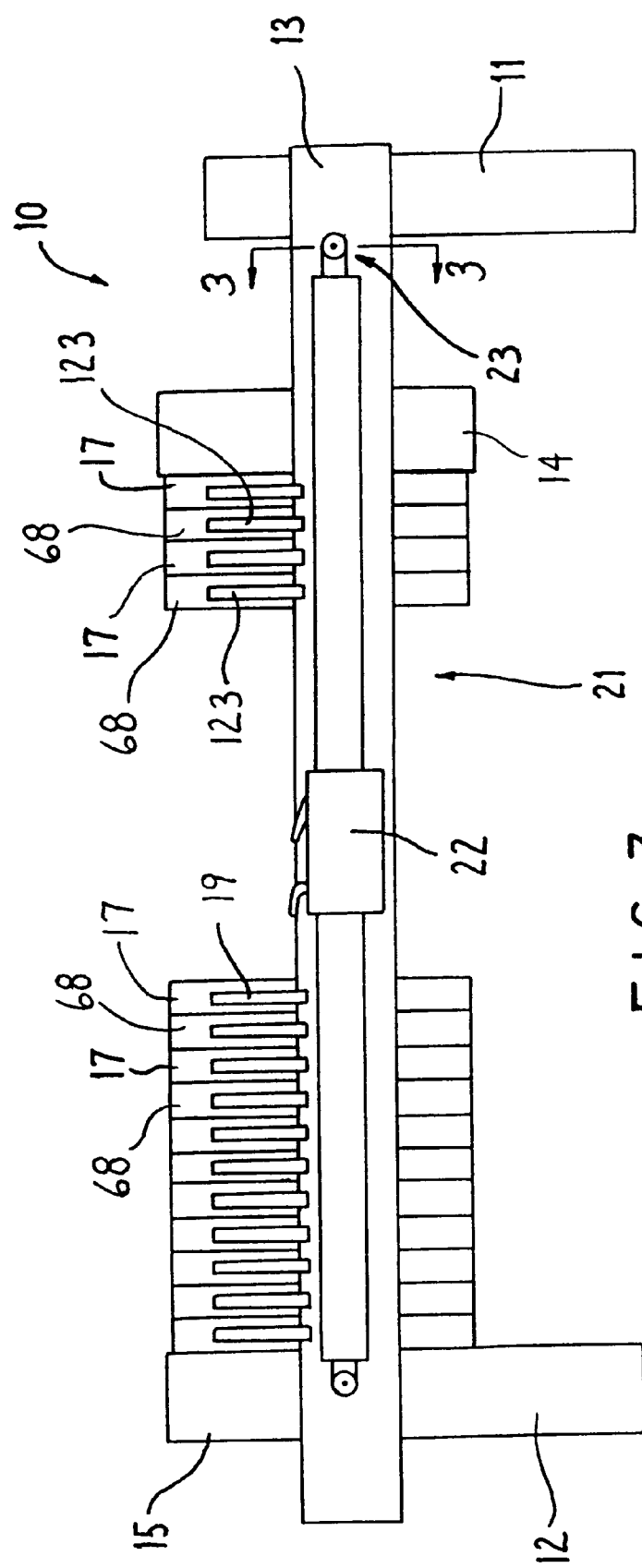

FILTER PRESS WITH ALTERNATING DIAPHRAGM SQUEEZE CHAMBER PLATES AND FILTRATION CHAMBER PLATES

FIELD OF THE INVENTION

This invention relates to a filter press for dewatering slurry and, more specifically, to an improved filter press arrangement including alternating diaphragm squeeze chamber plates and filtration chamber plates for effecting more efficient separation of liquid from slurry, and the method for effecting such separation.

BACKGROUND OF THE INVENTION

Filter presses are well known and extensively utilized for separating solids from slurries. Such filter presses employ a plurality of filter plates which are held in contacting relationship between fixed and movable head members while the slurry is pumped into and through the press for collecting the solids in the form of cake between adjacent filter plates. When the press is full, the movable head is backed away from the plates into an open position and the plates are moved into an open position to permit discharge of the cake which is collected between adjacent pairs of plates. To permit movement of the plates into an open position, plate shifting mechanisms are typically provided adjacent opposite sides of the press for permitting automatic or manual control over the plate movement and cake discharge.

Various types of filter plates are utilized in filter presses, depending primarily upon the material to be filtered and the process requirements. For example, one type of plate is a cloth-type chamber plate which includes recessed surfaces on opposite sides of the plate each of which serves to form a filter chamber with an adjacent plate when the plates are clamped together. A cloth filter covers each of these recessed surfaces, and is either mounted on the plate by a gasket or is draped between two adjacent plates. Thus, slurry is pumped into the filter chambers formed between the filter cloths of two adjacent plates, and the liquid from the slurry passes through the filter cloth and is discharged through filtrate ports in the plates. The solids are trapped in the filter chamber and form a cake.

Another type of filter plate which is utilized when process requirements call for production of a dryer filter cake is a diaphragm-type squeeze plate. The construction of this type of plate is similar to the cloth-type chamber plate, but the drainage surfaces on the opposite faces of the plate are flexible diaphragms or membranes which define pressurizing chambers therebehind. A filter cloth covers the outer face of the diaphragm on each side of the plate and typically extends beyond the plate, i.e., the filter cloths are typically draped between the adjacent plates. In this case, slurry is pumped into the filter chambers formed between two neighboring plates and the liquid portion of the slurry passes through the filter cloths and is discharged through filtrate ports in the plates. After the filling cycle is complete and the filter chambers formed between adjacent plates are filled with solids, and before the press is opened, heated air or hot pressurized water is supplied to the chamber located behind each diaphragm, causing the diaphragms to flex outward and exert mechanical pressure on the filter cake. This also effects heating of the filter cake which, in conjunction with a vacuum applied to the discharge side of the filter cloths, causes additional moisture to be removed from the filter cake. An example of this type of arrangement and process is disclosed in U.S. Pat. No. 5,558,773. A similar press and process is also sold by the assignee hereof under the designation "J-VAP".

Diaphragm-type squeeze plates are designed for high-pressure squeeze and must be ported for filtrate discharge. The diaphragm plates are relatively expensive as compared to the cloth-type chamber plates discussed above, for example being typically two to three times as expensive. In this regard, the diaphragm in one conventional construction is integrally joined around the periphery thereof to the ring-like frame of the filter plate, such as by welding. In another conventional construction the diaphragm is a wholly separate plate which overlies and is fixed to the side face of the ring-like frame by fasteners such as screws. Also, the face of the diaphragm which is located behind the filter cloth is typically ribbed in order to define flow paths for liquid discharge behind the filter cloth, and the filter cloth must typically be draped between adjacent plates, which can result in increased liquid leakage from the press. Because of the above, the diaphragms are relatively thick in order to provide structural integrity to the plate. For example, a typical diaphragm may have a thickness of about 0.120 inch between the ribs and about 0.250 inch at the ribs). As such, the thickness of the diaphragm causes a large temperature drop thereacross which impedes heating and thus drying of the filter cake, and this thickness can also impede effective squeezing of the filter cake. These factors thus increase cycle time and decrease the overall operational efficiency of the press.

Accordingly, it is an object of the present invention to provide an improved filter press which overcomes or minimizes the disadvantages of the above-discussed prior art.

One preferred embodiment of the filter press according to the invention includes a filter press having a frame with a pair of generally horizontally elongated and parallel side rails which are disposed in sidewardly spaced relation. Head assemblies are mounted on the frame adjacent opposite ends of the side rails, with a first head assembly being disposed adjacent one end of the side rails for movement horizontally in a lengthwise direction of the side rails forwardly toward and rearwardly away from a second head assembly so as to be respectively positioned in closed and open positions. The second head assembly is stationarily positioned adjacent the other end of the side rails. A plurality of plates are supported on and between the side rails for movement therealong between the two head assemblies. The plates are pushed together into a horizontally extending closed stack and clampingly held between the two head assemblies when the first head assembly is moved toward the second head assembly into the closed position. A plate shifting arrangement effects individual and sequential shifting of the plates from the closed stack along the side rails in the rearward direction toward the first head assembly when in the open position. A first group of plates includes first plates having a frame with a pair of oppositely disposed faces which are recessed inwardly. A liquid impermeable diaphragm or membrane is fixed to the frame and extends across one of the recessed faces to define a first pressure chamber therebetween, and another liquid impermeable membrane is fixed to the frame and extends across the other recessed face to define a second pressure chamber therebetween. A second group of plates includes second plates having a frame with a pair of oppositely disposed faces which are recessed inwardly. A liquid permeable filter member (i.e. cloth or sheet) is fixed to the frame thereof and extends across one of the recessed faces to define a first drainage chamber in communication with a filtrate discharge passage. A second liquid permeable filter member is fixed to the frame and extends across the other recessed face to define a second drainage chamber in communication with a filtrate discharge passage. The first and second plates are disposed in an alternating manner along the side rails in adjacent sealing contact with each other in the closed position of the press so that each two adjacent plates (i.e., the adjacent first and second plates) define a filter chamber therebetween for filtering and collecting solids from a slurry entering the filter chamber. The liquid portion of the slurry penetrates the filter member, enters the drainage chamber and exits the filter press via a filtrate discharge passage, while the solid portion of the slurry remains in the filter chambers. The pressure chamber defined between the liquid impermeable membrane and the recessed face is in fluid communication with a fluid source which expands the membrane towards the opposed adjacent filter member to pressurize the slurry to facilitate liquid-solid separation.

Another preferred embodiment of the filter press according to the invention includes a filter press having a plate arrangement including a plurality of individual plates movable into a closed stack. The plurality of plates includes first plates each including a peripheral edge portion, a central portion recessed inwardly with respect to the peripheral edge portion, a first liquid impermeable membrane extending across one side of the central portion to define a first pressure chamber therebetween, and a second liquid permeable membrane extending across the other side of the central portion to define a second pressure chamber therebetween. The plurality of plates also includes second plates each including a peripheral edge portion, a central portion recessed inwardly with respect to the peripheral edge portion, a first liquid permeable filter member extending across one side of the central portion of the second plate to define a first drainage chamber therebetween, and a second liquid permeable filter member extending across the other side of the central portion of the second plate to define a second drainage chamber therebetween, the second plate being free of membranes. The first and second filter plates are disposed in an alternating manner along the filter press in adjacent sealing contact with one another to define a filter chamber therebetween for filtering and collecting solids from a slurry entering the filter chamber.

Yet another preferred embodiment of the invention includes a plate arrangement including a plurality of individual plates movable into a closed stack. One of the plates includes a peripheral edge portion which surrounds a central portion having two sides which face away from one another and are recessed inwardly with respect to the peripheral edge portion. The peripheral edge portion has a recess disposed therein in communication with a filtrate discharge passage. A liquid impermeable membrane extends across each side of the central portion to define a pressure chamber therebetween, and a liquid permeable filter member extends across each membrane to define a drainage area therebetween. A drainage member is associated with the membrane and is engaged within the recess, and the drainage member has a flow passage disposed therein for providing communication between the drainage area and the recess.

The present invention also relates to a method of effecting liquid-solid separation of a slurry which includes clamping a plurality of plates together into a horizontally extending closed stack such that the plates sealingly contact one another, the closed stack including a plurality of first and second plates disposed in an alternating manner, feeding slurry into the closed stack and into a filter chamber defined between adjacent first and second plates. The liquid portion of the slurry is filtered through filter members disposed on each face of the second plates and discharged into a filtrate vessel, with the solid portion of the slurry forming a filter cake in the filter chambers. Membranes disposed on each face of the first plates are expanded towards the adjacent filter members and against the slurry to facilitate further liquid-solid separation by adding heated fluid to a pressure chamber located behind each membrane.

The present invention also includes a thin flexible diaphragm, for example about 0.023 inch thick. This thin design of the diaphragm provides for more efficient use of the squeeze pressure, and also provides greater heat transfer into the filter cake which raises the temperature thereof to provide more efficient vaporization and vapor draw when vacuum is applied to the liquid discharge passage. The present invention also significantly reduces cycle time, particularly for slurries which tend to fill the press quickly.

The diaphragm plate according to the invention can be constructed from a standard plate by simply machining the plate to accommodate the diaphragm. In this regard, a conventional diaphragm-type squeeze plate is about three to six times as costly as a standard cloth-type filtration plate. However, the diaphragm squeeze plate in accordance with this invention costs approximately the same as the standard cloth-type filtration plate, thereby significantly reducing the overall cost of the press.

Further objects of the invention will be apparent to persons familiar with structures and methods of this general type upon reading the following specification and inspecting the accompanying drawings.

BRIEF DESCRIPTION OF THE DRAWINGS

FIGS. 1 and 2 are diagrammatic top and side views, respectively, of a conventional filter press.

FIG. 3 is a side view of a filter press in accordance with the present invention.

Figure 4:
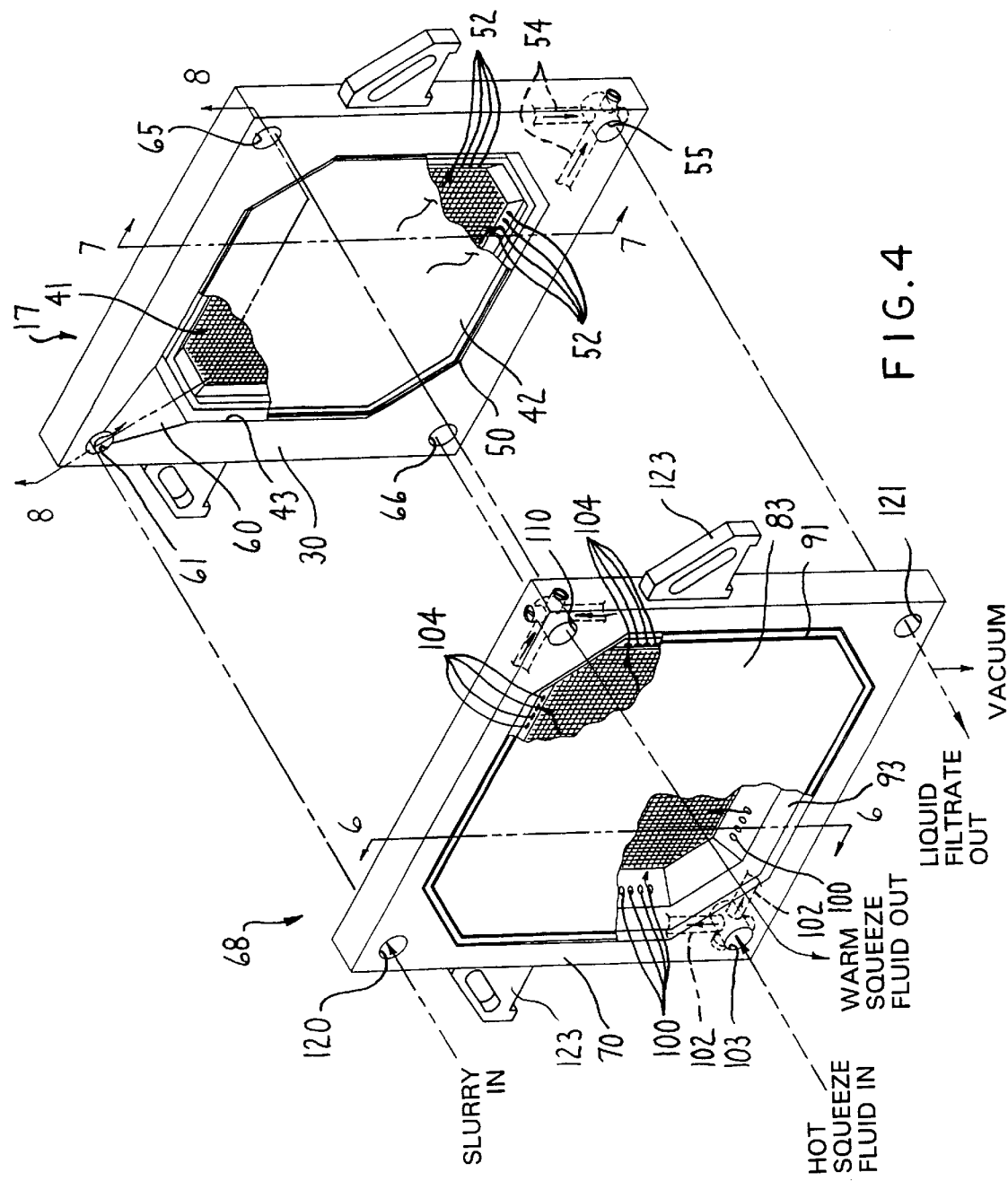
FIG. 4 is an exploded view of a portion of the filter press of FIG. 3, including a diaphragm squeeze plate and a filtration plate.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will be used in relationship to leftward shifting of the filter plates in FIGS. 1 and 2, and the word "rearwardly" will refer to rightward shifting of the filter plates in the same figures. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

As shown in FIGS. 1 and 2, there is illustrated a filter press 10 having a pair of end supports 11 and 12 rigidly joined together by a pair of generally parallel and horizontally elongate side rails 13, which side rails 13 are sidewardly spaced apart and cooperate with the end supports 11 and 12 to define a generally rigid frame.

The filter press 10 has a movable follower or head arrangement 14 disposed adjacent one end of the press frame and slidably supported for movement along the side rails 13. This movable head 14 is slidably displaceable horizontally along the side rails toward or away from a further head 15 which is fixed to the frame adjacent the other end of the side rails 13. A drive device 16, such as a conventional double acting pressure cylinder, is mounted on the frame and cooperates with a movable head 14 for controlling movement thereof either toward or away from the fixed head 15.

A plurality of conventional filter plates 17 perform the filtering function of the press 10. The plates 17 are suspendingly supported on and between the side rails 13. The plates 17 extend generally transversely between the side rails 13 so that the plates 17 are disposed in adjacent relationship to form a generally horizontally extending stack of plates 17 in a longitudinal direction of the press 10. Each plate 17 has support arms or handles 19 which project outwardly from opposite sides of the respective plate in overlapping and slidable supportive engagement with the upper edges of the side rails 13, thereby enabling the plates to be slidably displaced along the side rails 13 in the longitudinal direction of the filter press 10. The support handles 19 have a width in the lengthwise direction of the press 10 which is significantly less than the width of the respective plates 17, whereby adjacent handles 19 define clearance spaces of predetermined width therebetween when adjacent plates are in abutting engagement, substantially as illustrated by FIG. 2.

As is conventional, the drive device 16 is activated to move the head 14 forwardly (leftwardly in FIGS. 1 and 2) so that the stack of plates 17 is snugly and tightly held between the opposed heads 14 and 15. One or both of these heads have suitable conduits (not shown) connected therethrough for communication with the interior of the stack of the plates 17. A slurry is supplied through one of the heads into the stack of plates, and the clean liquid (i.e. filtrate) flows outwardly through the plates and out through a conduit, whereupon the solids collect between two adjacent plates 17 as discussed hereinafter.

To permit removal or dumping of the solids (i.e. filter cake) which collect between the plates, the head 14 is moved rearwardly (rightwardly in FIGS. 1 and 2) into an open position substantially as illustrated in FIG. 2, and the plates 17 are then individually and sequentially moved rearwardly (rightwardly in FIG. 2) away from the stack toward the movable head 14 to permit the solids which collect between two adjacent plates to drop downwardly for deposit into a suitable collecting bin (not shown). To effect sequential and individual movement of the plates 17 away from the stack toward the open head 14, the filter press 10 has a plate shifting arrangement 21 which includes a pair of plate shifter mechanisms 22, one such mechanism 22 being disposed exteriorly adjacent each of the side rails 13, and a drive mechanism 23 which connects to the pair of shifter mechanisms 22 for effecting synchronous linear back and forth movement of these mechanisms 22 along the side rails 13. One example of such a plate shifting arrangement 21 is disclosed in U.S. Pat. No. 5,674,384 which is incorporated by reference herein.

Turning now to the individual conventional plates 17, reference is made to FIGS. 4, 5, 7 and 8.

It will be appreciated that the plates 17 are identical to one another and thus only one such plate 17 will be described below.

The plate 17 includes a frame structure with an outer ring-like peripheral edge frame 30 which is generally rectangular, and generally flat faces or surfaces 31 and 32 on opposite sides thereof, which faces 31 and 32 extend in generally parallel relationship and, in the typical orientation of the filter plate 17 on the press, are normally oriented vertically. The frame structure also includes a divider wall 33 which is rigidly joined to and extends across the entire center of the peripheral edge frame 30. In a conventional construction the peripheral edge frame 30 and divider wall 33 can be integrally formed in one piece, such as of a plastics material. The divider wall 33 has a reduced thickness relative to the thickness of the peripheral edge frame 30, resulting in the frame structure defining shallow recesses 34 on opposite sides thereof, which recesses 34 are transversely enlarged and have a bottom wall 40 defined by the divider wall 33. This bottom wall 40 is typically provided with a non-smooth surface, such as ribs or a plurality of small transversely spaced projections 41, for a purpose as explained below.

The filter plate 17 also mounts thereon a filter cloth 42 for association with each of the shallow recesses 34. The filter cloth 42 is a thin flexible sheet-like member which readily permits transmission of fluid, specifically liquid, therethrough while preventing passage of solids, and such cloth 42 may for example comprise a thin sheet of woven polypropylene. The filter cloth 42 is mounted on the frame structure so as to extend across the shallow recess 34, and for this purpose the frame structure is provided with a shallow groove 43 which opens transversely inwardly from the side face of the frame structure in surrounding relationship to the shallow recess 34. The grooves 43 are defined within respective side surfaces of peripheral edge frame 30 which face away from one another. An outer peripheral terminal edge portion 44 of the filter cloth 42 is retained in this groove 43 by a suitable retaining strip such as an elongate elastomeric retaining element 50 which overlies the filter cloth 42 and holds the edge portion 44 thereof in the groove 43. With the filter cloth 42 mounted on the frame structure, there is defined a chamber 51 between the filter cloth 42 and the bottom wall 40 of the recess 34 so as to permit passage of liquid through the filter cloth 42 into this chamber 51, with the projections 41 on the bottom wall 40 being such as to prevent the filter cloth 42 from snugly adhering to the bottom wall 40 and thus defining suitable passages so as to permit escape of liquid from the chamber 51.

Figures 6, 7:
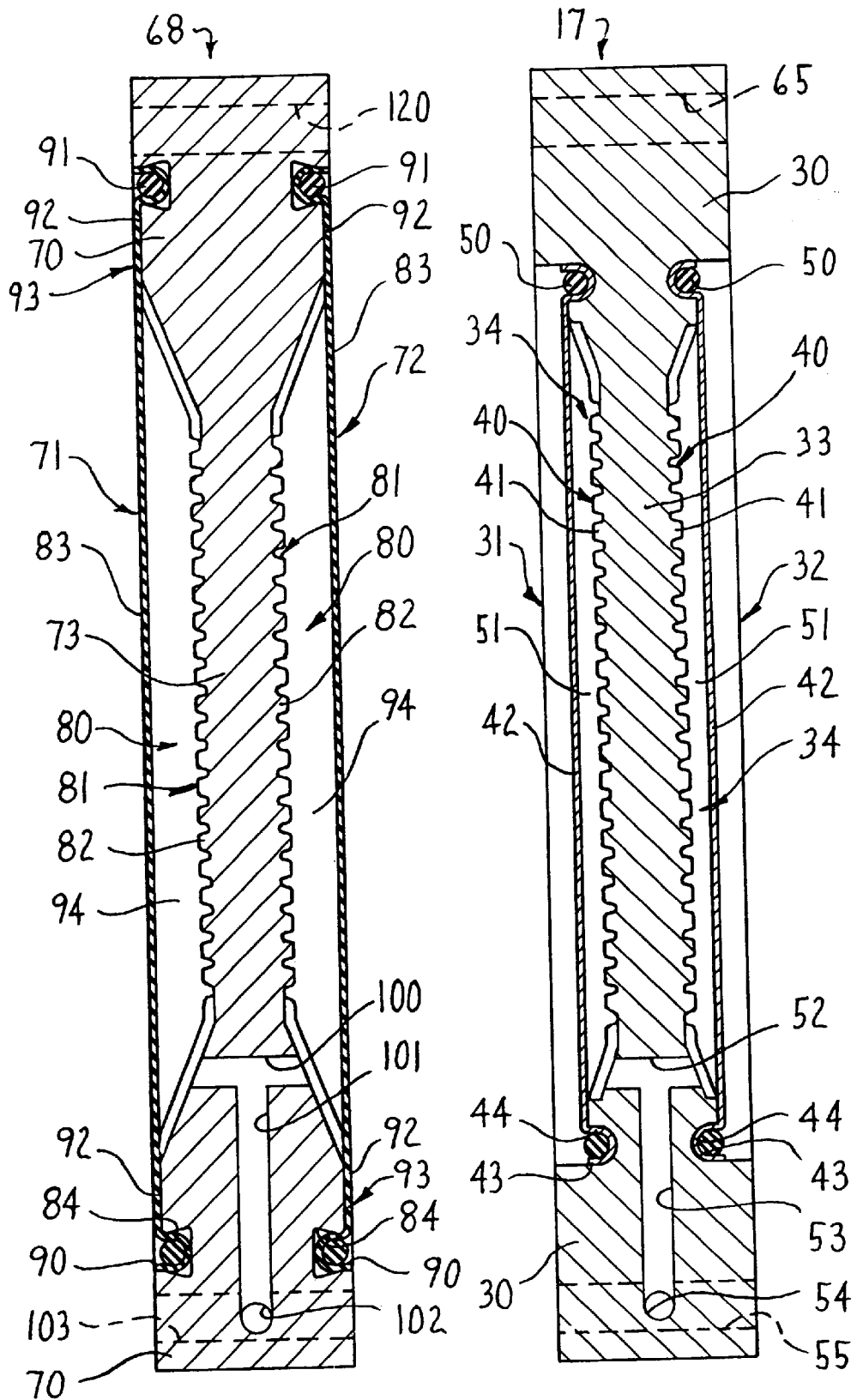
FIG. 6 is an enlarged cross sectional view taken generally along line 6—6 of FIG. 4.
FIG. 7 is an enlarged cross sectional view taken generally along line 7—7 of FIG. 4.

As shown in FIGS. 4 and 7, for discharge of liquid from the chamber 51, the frame structure has a plurality of discharge passages 52 (here eight) formed therethrough adjacent at least one lower corner of the recess 34 for communication with the liquid-receiving chambers 51, and these discharge passages 52 in turn communicate with additional discharge passages 53 and 54 which in turn communicate with a flow passage or bore 55 which extends transversely through the peripheral edge frame 30 adjacent at least one corner of the filter plate 17. These latter flow passages 55 define an elongate flow passage when a plurality of plates 17 are disposed in generally stacked relationship. It should be understood that FIG. 7 shows only one set of discharge passages 52, 53 and 54, and that the other discharge passages communicate with flow passage 55 in a similar manner.

Figure 8:
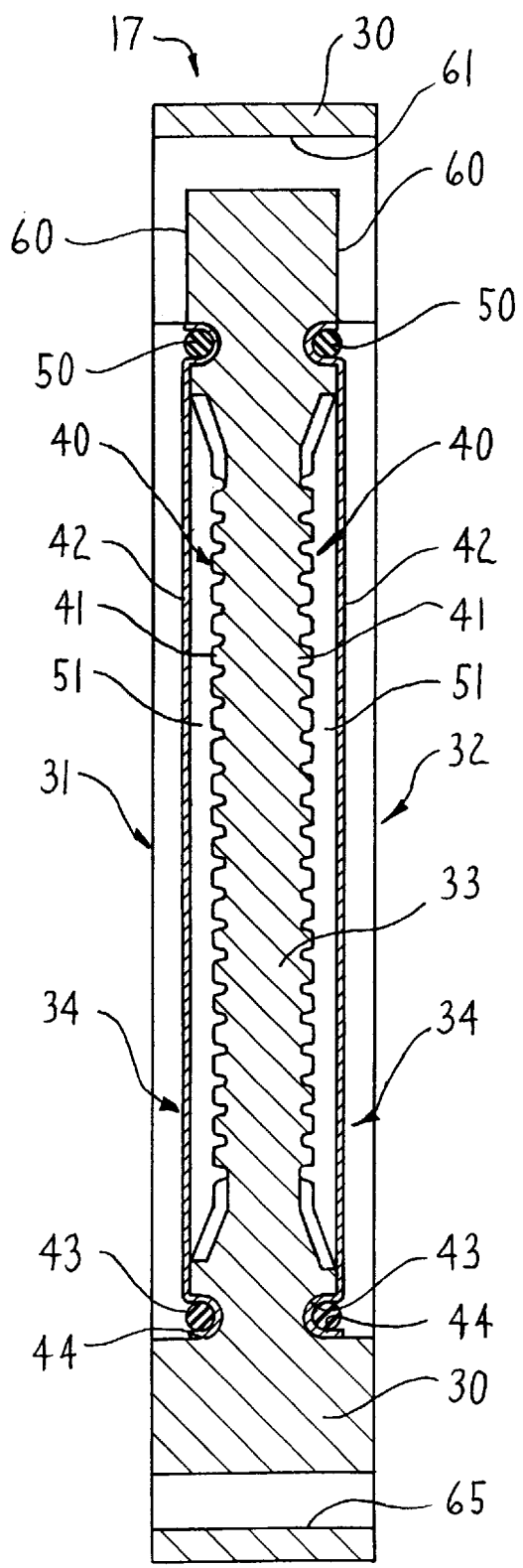
FIG. 8 is an enlarged cross sectional view taken generally along line 8—8 in FIG. 4.
Figure 9:
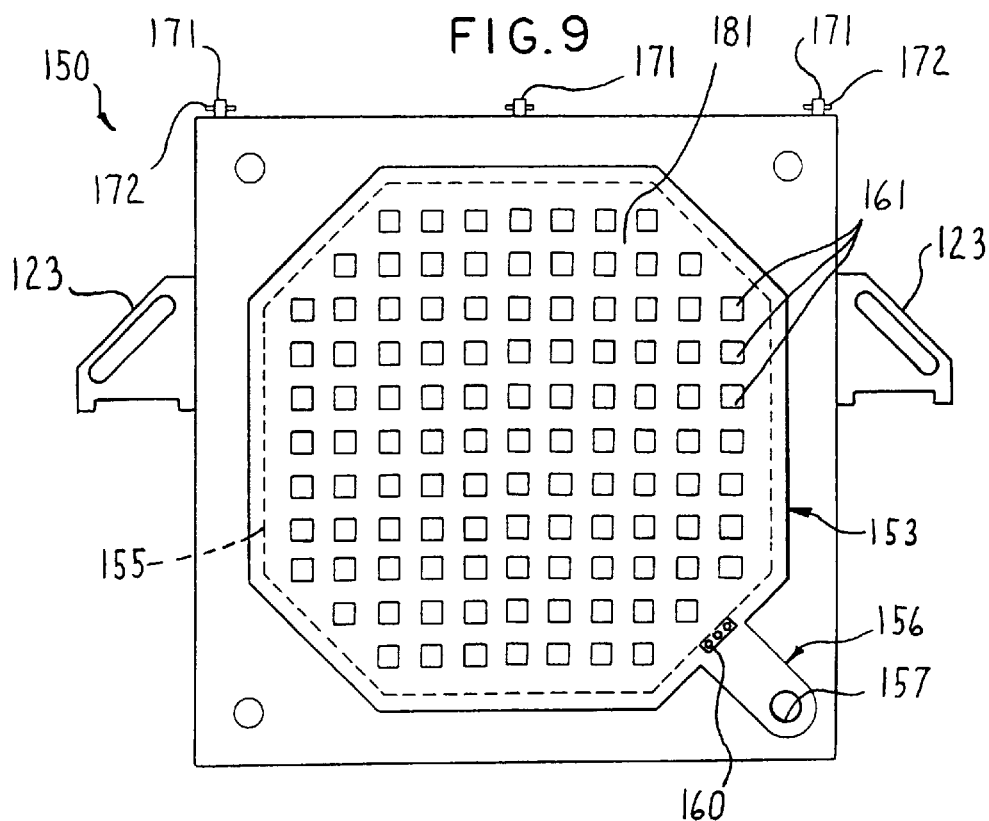
FIG. 9 is a plan view of a variation of the diaphragm squeeze plate without the filter cloths mounted thereon.

As shown in FIGS. 4 and 8, for feeding slurry into the stack of plates 17, the peripheral edge frame 30 includes respective sidewardly or tranversely opening reliefs 60 on the opposite side surfaces thereof at a diagonally opposite upper corner of plate 17 from passages 55, which reliefs 60 form inlet passages which communicate with a flow or bore 61 which extends transversely through the peripheral edge frame 30 adjacent a corner of plate 17. Similarly to flow passages 55, the flow passages 61 of plates 17 define an elongate flow passage when a plurality of plates 17 are disposed in generally stacked relationship. When the plates 17 are in this stacked relationship, a filter chamber is formed between the facing filter cloths 42 of two adjacent plates 17. Thus, slurry is fed through one of the heads into flow passages 61 and enters the filter chambers via the inlet passages formed by the reliefs 60 of opposed adjacent plates 17. Solids collect in the filter chambers and the liquid filtrate is discharged from the filter chambers via chambers 51, passages 52, 53 and 54 (FIG. 7), and the elongate flow passage formed by flow passages 55 to a discharge vessel (not shown).

For purposes discussed further below, the frame structure of plate 17 also includes additional flow passages or bore 65 and 66 extending transversely through the peripheral edge frame 30 diagonally opposite one another at the upper and lower corners of plate 17, respectively.

The overall structure and function of the filter press 10 and filter plates 17 as discussed above is conventional and well known.

As shown in FIGS. 4 and 6, the present invention includes a plurality of diaphragm-type squeeze plates 68 which are identical to one another, and thus only one such plate 68 will be described here.

More specifically, the diaphragm plate 68 includes a frame with a ring-like peripheral edge portion 70 which is generally rectangular in shape and has generally flat faces 71 and 72 located on opposite sides thereof. The faces 71 and 72 are generally parallel to one another and, when oriented on the press, are disposed vertically. The frame includes a center partition 73 which is rigidly joined to and defines the entire center of the peripheral edge portion 70. The center partition 73 and the peripheral edge portion 70 can preferably be integral with one another, and can comprise a molded plastic, such as polypropylene. The center partition 73 is reduced in thickness as compared to the peripheral edge portion 70 so as to define transversely enlarged shallow recesses 80 on opposite sides thereof, which recesses 80 have a rear wall 81 defined by the center partition 73. This rear wall 81 can be provided with a non-smooth surface such as ribs or a generally rectangular array of transversely spaced projections 82. However, as explained below, the provision of ribs or projections 82 is not critical, and thus the rear wall 81 may be smooth in configuration or configured otherwise.

The diaphragm plate 68 also includes a diaphragm or membrane 83 (shown in broken section in FIG. 4) associated with each of the recesses 80. The diaphragm 83 is a thin, flexible sheet of liquid impermeable elastomeric material, preferably neoprene with nylon fabric reinforcement. In accordance with one preferred embodiment of the invention, the diaphragm 83 has a uniform thickness ranging from about 0.015 to about 0.040 inches, with about 0.023 inches being the preferred thickness. This reduced thickness of diaphragm 83 as compared to conventional diaphragms (which have a thickness ranging from about 0.120 to about 0.250 inches) provides the diaphragm 83 with greater flexibility and greater heat transmission efficiency.

The diaphragm 83 is mounted on the frame so as to extend across the shallow recess 80 by means of a sidewardly opening shallow groove 84 which surrounds the recess 80. The grooves 84 are defined within respective side surfaces of peripheral edge portion 70 which face away from one another. An outermost peripheral edge portion or terminal edge 90 of the diaphragm 83 is retained in the groove 84 by a retaining strip, such as an elongated elastomeric retaining strip 91 which overlies the diaphragm 83 and holds the edge portion 90 thereof in the groove 84. The edge portion 90 of diaphragm 83 in the illustrated embodiment in continuous and defines the outermost perimeter of the diaphragm 83. As shown in FIG. 6, a portion 92 of the diaphragm 83 located inwardly of the retaining strip 91 extends in a contacting manner across a planar ring-shaped side surface 93 of the frame located between the recess 80 and groove 84.

With the diaphragm 83 mounted on the frame, a squeeze chamber 94 is defined between the diaphragm 83 and the rear wall 81 of the recess 80. Further, in the illustrated embodiment, each of the diaphragms 83 when in a non-pressurized state have a planar configuration as same extend between opposite diametrical points defined along the corresponding retaining strip 91.

The frame of plate 68 includes, adjacent a lower corner of the recess 80, a plurality of inlet passages 100 (here eight) formed therethrough for communication with the squeeze chambers 94 defined on opposite sides of the plate. The inlet passages 100 communicate with additional inlet passages 101 and 102 (only one set of inlet passages being shown in FIG. 6) which in turn communicate with a flow passage or bore 103 which extends transversely through the peripheral frame edge portion 70 adjacent a lower corner of the plate 68.

The frame of plate 68 also includes, at an upper corner of plate 68 diagonally opposite inlet passages 100, a plurality of discharge passages 104 (here eight) formed therethrough which also communicate with squeeze chambers 94. Discharge passages 104 communicate with a flow passage or bore 110 which extends transversely through the peripheral frame edge portion 70 adjacent the upper corner of plate 68 via a plurality of discharge passages which are not shown but are similar to inlet passages 101 and 102 (FIG. 6).

Inlet passages 100, 101 and 102 and flow passage 103 are utilized to supply fluid to squeeze chambers 94 which in turn causes diaphragm 83 to bulge outwardly in a direction away from center partition 73, as discussed hereinbelow. Discharge passages 104 and flow passage 110 (and the not shown discharge passages which interconnect them) are utilized to carry fluid out of the squeeze chambers 94, as also discussed hereinafter.

The frame of plate 68 also includes additional flow passages or bores 120 and 121 extending transversely through the peripheral edge portion 70 diagonally opposite one another at the upper and lower corners of the plate 68, respectively, for a purpose as explained below.

Similar to plate 17, the plate 68 has support handles 123 (FIG. 3) which project outwardly from opposite sides of the plate 68 for engagement with the side rails of the press.

Figure 5:
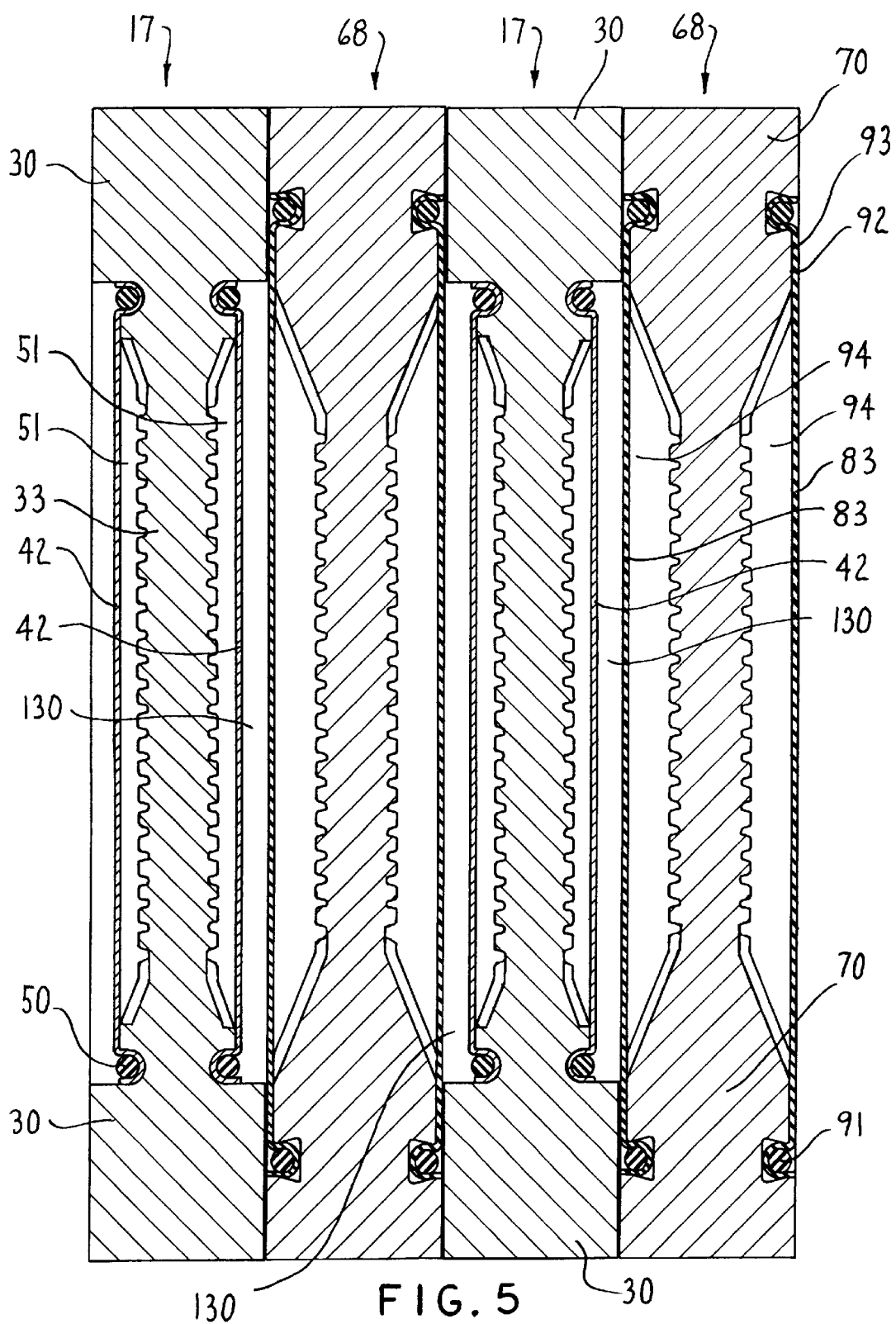
FIG. 5 is a generally central cross sectional view through four adjacent plates shown in a closed position.

The present invention utilizes the above-discussed conventional cloth-type filter plates 17 along with the diaphragm plates 68. The plates 17 and 68 are disposed in an alternating manner along the press 10, such that when the plates 17 and 68 are clamped together in the closed position as shown in FIG. 5, each adjacent pair of plates 17 and 68 forms a filter chamber 130 therebetween. Each filter chamber 130 is, in this embodiment of the invention, defined on one side by a diaphragm 83 of plate 68 and on the other side by a filter cloth 42 of plate 17.

In operation, the plates 17 and 68 are clamped together to form a continuous, longitudinally extending stack (FIG. 3). The peripheral edge frame 30 of plate 17 and specifically a planar area of peripheral edge frame 30 disposed adjacent the corresponding groove 43, abuts the planar side surface 93 of peripheral frame edge portion 70 of adjacent plate 68 and is disposed in juxtaposed face-to-face relation therewith, and a seal is formed therebetween by means of the portion 92 of the diaphragm 83 which extends across surface 93 of plate 68 (FIG. 5), which portion 92 is clamped between opposed adjacent plates 17 and 68 when the press is closed. The corner flow passages of each of the plates 17 and 68, when the plates 17 and 68 are disposed in adjacent and sealed relationship with respect to one another, define four seperate elongated and longitudinally extending flow passages or conduits. If desired, O-ring gaskets may be provided about the corner flow passages of at least one of plates 17 and 68 to seal the flow passages during operation.

As shown in FIG. 4, the slurry to be filtered is fed by a feed pump (not shown) into the elongated flow conduit (or slurry supply conduit) formed by flow passages 120 and 61 of plates 68 and 17 respectively. The slurry is introduced into the filter chambers 130 formed between pairs of adjacent plates 17 and 68 by means of the reliefs 60 of plates 17 (FIGS. 4 and 8). The reliefs 60, along with the peripheral edge portions 70 of the respective opposed plates 68, define respective passages opening into the corresponding filter chambers 130. The liquid permeable filter cloth 42 of each plate 17 permits the liquid filtrate to exit from one side of the filter chamber 130 while trapping the solids inside the filter chamber 130 between the filter cloth 42 and the diaphragm 83 of the adjacent plate 68. The liquid filtrate penetrates the filter cloth 42, enters the chamber 51 behind the filter cloth 42 and is discharged through the discharge passages 52, 53 and 54 and the elongated flow conduit (or filtrate discharge passage) formed by flow passages 55 and 121 of plates 17 and 68, respectively, to a filtrate vessel (not shown). Thus, in this embodiment, the liquid portion of the slurry from the filter chambers 130 drains solely through the respective plates 17 as the plates 66 are free of filter cloths.

A solid filter cake ultimately forms in each of the filter chambers 130 which presses the diaphragms 83 and the filter cloths 42 away from one another and inwardly toward the center partition 73 and divider wall 33 of each of the respective plates 68 and 17. As mentioned above, the array of projections 41 of plates 17 define a network of flow channels behind the filter cloths 42 and thus provide for fluid flow even when the filter chambers 130 are full and the filter cloths 42 are pressed against the divider walls 33.

For additional drying of the filter cake, heated fluid (water or air) is fed into the elongated conduit (or fluid intake conduit) formed by flow passages 103 and 66 of the respective plates 68 and 17 via a fluid manifold (not shown). The heated fluid enters each of the squeeze chambers 94 of the plates 68 via inlet passages 102, 101 and 100 and expands the thin, flexible diaphragms 83 outwardly toward the opposed filter cloth 42 of adjacent plate 17 and against the filter cake to squeeze and heat the filter cake to its vaporization temperature. In this regard, the network of channels formed between the projections 82 of rear wall 81 (of plate 68) may assist in "popping" the diaphragms 83 outwardly, but are not critical, and the rear wall 81 of plate 68 may alternatively be smooth or otherwise contoured.

The warm fluid is preferably discharged from the squeeze chambers 94 via the discharge passages 104 and the elongated flow conduit (or fluid discharge conduit) formed by flow passages 110 and 65 of the respective plates 68 and 17.

The filter cakes are thus squeezed due to the heated fluid as supplied to the squeeze chambers causing expansion of the diaphragms, thereby causing additional moisture in the filter cake to be discharged through the opposed filter cloths. The filter cakes are also heated due to the heat of the squeeze fluid being transferred through the thin flexible diaphragms into the filter cakes. This causes additional moisture in the filter cakes to vaporize, which vapors are removed from the filter chambers 130 by a vacuum pump (not shown) which communicates with chambers 51 of plates 17 and applies a vacuum during the squeeze cycle. Thus, vapor draw occurs through the plates 17 by means of the same route as is used for the discharge of liquid filtrate from chambers 51. During the vacuum cycle, the slurry feed pump is shut off, as is the elongated flow passage formed by flow passages 120 and 61 of respective plates 68 and 17. In this regard, the above-discussed seal as provided by the membrane portion 92 clamped between adjacent plates 17 and 68 provides for a more efficient vacuum in the filter chambers.

Once the squeeze cycle is complete, the plates 17 and 68 are unclamped and sequentially moved away from one another and the filter cakes are dislodged from therebetween.

Since the diaphragms 83 are of uniform thickness and are much thinner than conventional diaphragms as discussed above, more efficient and uniform heat transfer occurs between the heated fluid pumped into the squeeze chambers 94 and the filter cakes lodged in the filter chambers 130. Thus, greater temperatures in the press 10 are achieved during the squeeze cycle, thus raising the temperature of the filter cakes. By raising the temperature of the filter cakes, more fluid in the form of vapor can be removed therefrom.

In accordance with an alternative embodiment of the present invention, the diaphragms of plate 68 may instead have a corrugated cross-section. As in the above-discussed embodiment, the corrugated diaphragm is thin (i.e. 0.0150–0.040 inches thick) and has a uniform thickness so as to provide optimum heat transfer and greater flexibility as discussed above.

Instead of a corner feed press as discussed above, the present invention may also be utilized with a conventional center feed press (not shown), wherein a centrally located flow passage is disposed in the frames of each plate and communicates with the filter chambers formed between two adjacent plates. In this embodiment, the centers of the diaphragms and the filter cloths are sealed about the central flow passage in each respective plate. Since the slurry enters the filter chamber by means of the center flow passages, the reliefs 60 of plate 17 are not necessary, and the plate 17 is instead provided at this corner with discharge passages similar to discharge passages 52, 53 and 54 of the embodiment shown in FIG. 7, which discharge passages communicate with chamber 51 and flow passage 61 of plate 17. Slurry is thus fed into the center flow passage and the liquid portion of the slurry is discharged from the upper and lower flow passages 61 and 55 of plate 17. Hot water (or hot air) for expanding the diaphragms 83 is pumped into flow passages 103 of plates 68 and warm water is discharged through flow passages 110 of plates 68 as in the first embodiment. A vacuum is applied by connecting a vacuum pump to flow passages 61 and 55 of plate 17.

The present invention may be utilized with a center feed system as discussed above, however, the retaining assemblies necessary to mount and seal the diaphragms and the filter cloths adjacent the center flow passages of each plate are typically complex and hence a center feed is believed less desirable.

An alternative embodiment of the present invention is shown in FIGS. 9–12, which show a modified diaphragm-type squeeze plate 150.

The diaphragm plate 150 is essentially identical to the diaphragm plate 68, except that diaphragm plate 150 includes a pair of filter cloths 152 each for association with a diaphragm 153 mounted on each side of the frame of plate 150, which diaphragms 153 are adapted for permitting drainage of liquid filtrate penetrating the filter cloths 152.

Components which are similar or identical to those discussed with regard to the embodiment of the diaphragm squeeze plate shown 68 in FIGS. 4–6 are identified with the same reference numbers. In addition, it will be appreciated that the invention includes a plurality of such diaphragm plates 150 which are identical to one another, and thus only one such plate 150 is described herein.

Figure 10:
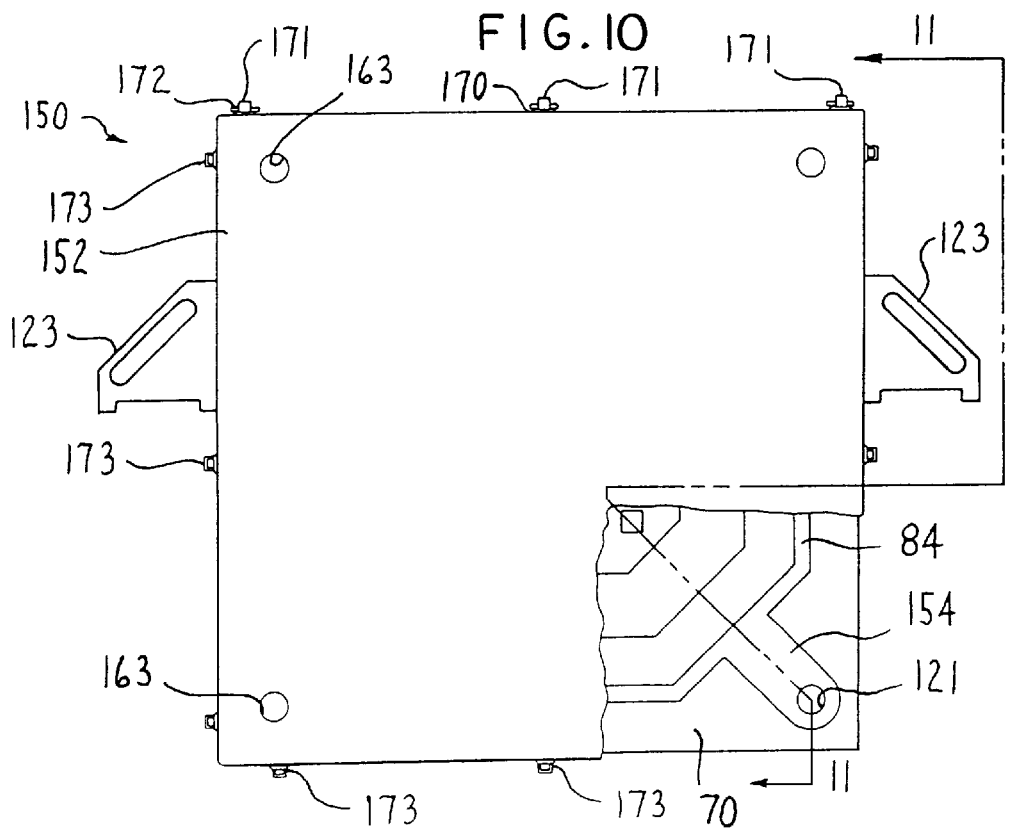
FIG. 10 is a view of the diaphragm squeeze plate similar to FIG. 9 including the filter cloths mounted thereon.
Figure 12:
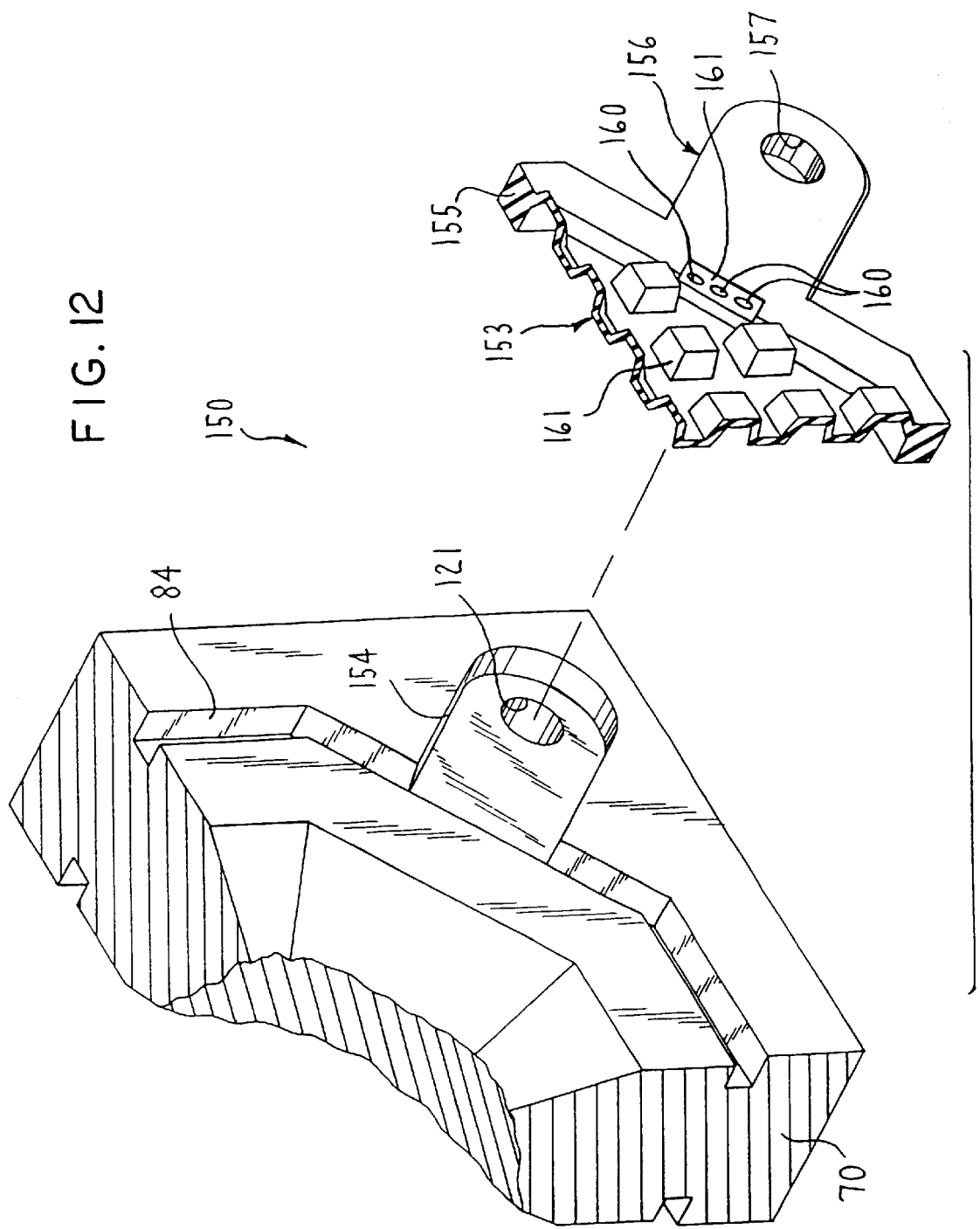
FIG. 12 is an enlarged, exploded, fragmentary view of the diaphragm squeeze plate of FIG. 9.

As shown in FIGS. 10 and 12 (FIG. 10 showing corner portions of the filter cloth 152 and diaphragm 153 broken away), the diaphragm plate 150, at a corner thereof adjacent flow passage 121, preferably includes a sidewardly opening shallow recess 154 which surrounds flow passage 121 for communication therewith, which recess 154 also communicates with groove 84.

The diaphragm 153 preferably has a non-smooth, sidewardly facing outer surface having ribs or a plurality of small, transversely spaced projections 161. In this regard, the diaphragm 153 is preformed to have the same shape as the projections 82 of the rear wall 81 (i.e. each of the projections 161 of diaphragm 153 define a hollow interior which is configured to fit over one of the projections 82 for a purpose as explained below). The diaphragm 153 is constructed of a liquid impermeable elastomeric material, such as neoprene reinforced with nylon fabric reinforcement. Further, the diaphragm 153, similarly to diaphragm 83, is a thin, sheet-like member having a uniform thickness ranging from about 0.015 to about 0.040 inches, with about 0.023 inch being the preferred thickness.

A sidewardly projecting, elongated, elastomeric retaining member such as a retaining strip or rib 155 (FIGS. 9 and 12) preferably extends about the entire outer periphery of the diaphragm 153 and is configured to cooperate with groove 84 so as to mount and seal the diaphragm 153 on the frame. A flange-like projection 156 extends outwardly from the retaining strip 155 and is shaped so as to cooperate with recess 154, and a flow passage 157 extends transversely through the projection 156 for communication with flow passage 121. Projection 156 also includes a plurality and preferably three elongated, orifices or flow passages 160 which communicate with flow passage 157. Flow passages 160 preferably open at a bevelled portion 161 (FIG. 12) of projection 156. Projection 156 functions as a drainage member as discussed below.

The retaining strip 155 and projection 156 are preferably integral with one another and formed by molding, and the diaphragm 153 is then molded to the retaining strip 155 and projection 156 such that the diaphragm 153, retaining strip 155 and projection 156 constitute a monolithic, one-piece elastomeric component. Alternatively, the diaphragm 153, retaining strip 155 and projection 156 may be formed in a single molding process.

The diaphragm plate 150 also mounts thereon the filter cloth 152 for association with each diaphragm 153. The filter cloth 152 is a thin, flexible and generally rectangular sheet-like member having an inner region which readily permits transmission of fluid, specifically liquid, therethrough while preventing passage of solids, and such cloth 152 may for example comprise a thin sheet of woven polypropylene. The filter cloth 152 is preferably impregnated with a liquid impermeable elastomeric material such as neoprene along an outer periphery thereof to provide a ring-like peripheral region 162 which is impermeable to liquids. A hole 163 is disposed at each corner of the filter cloth 152 within peripheral region 162, which holes 163, in the assembled condition of plate 150, are aligned with each of the corner flow passages 103, 110, 120 and 121 of plate 150 for communication therewith. The filter cloths 152 are draped over each side of the diaphragm plate 150 so as to cover the respective diaphragms 153 and define the outwardly facing sides of plate 150.

Figure 11:
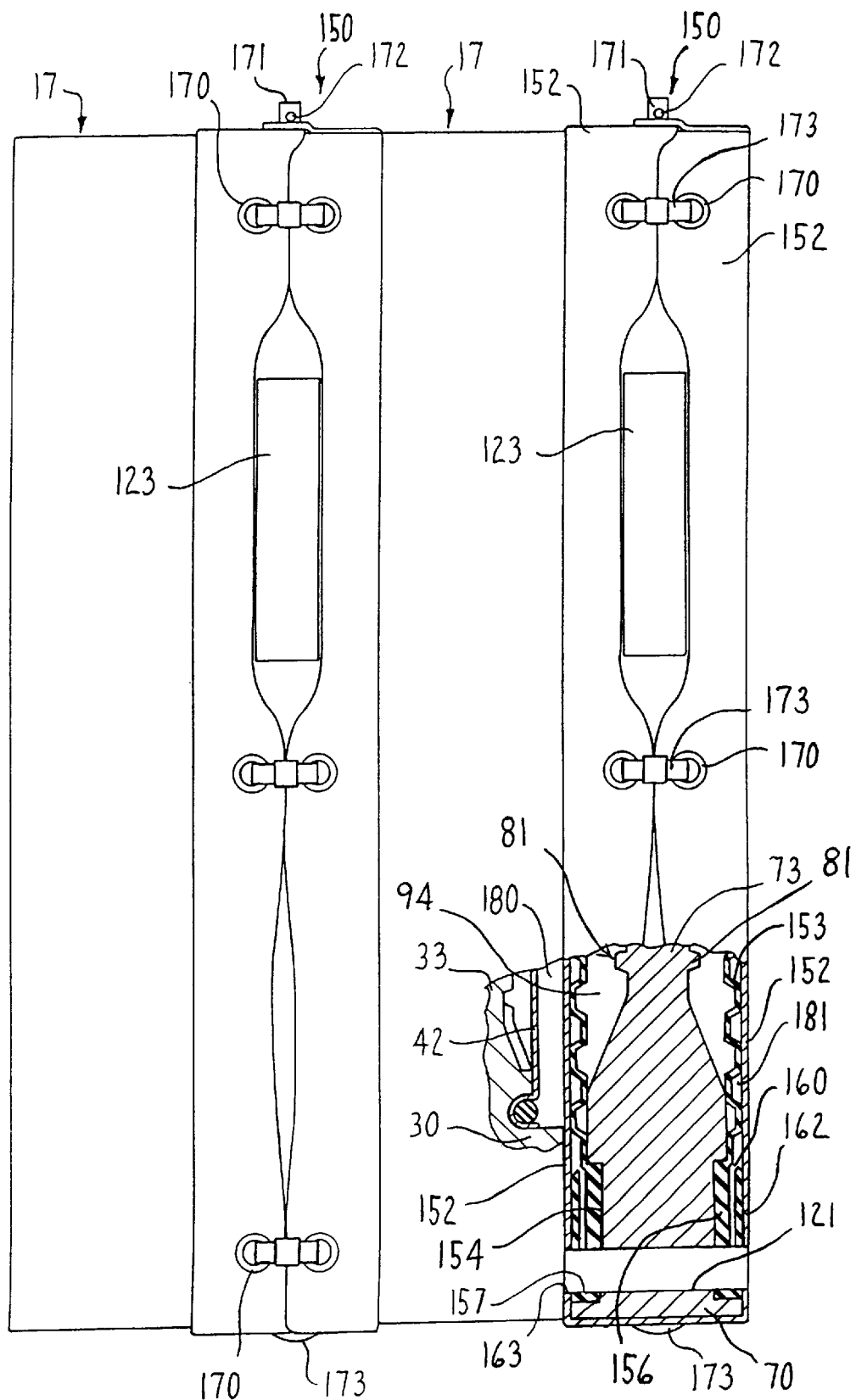
FIG. 11 is a side view of four adjacent plates shown in a closed position showing a portion of the filtration plate in cross-section and showing view 11—11 of the diaphragm squeeze plate of FIG. 10.

As shown in FIG. 11, the filter cloths 152 include a plurality and preferably three eyelets or grommets 170 disposed in an evenly spaced-apart manner along each edge thereof. The eyelets 170 (FIGS. 10 and 11) disposed along the top edge of each filter cloth 152 engage with three correspondingly spaced, upwardly projecting posts 171 which are disposed along the top edge surface of the diaphragm plate 150. Each post 171 is preferably provided with a removable cotter pin 172 which extends transversely therethrough and prevents the eyelets 170 along the upper edges of the filter cloths 152 from disengaging from the posts 171. The filter cloths 152 thus overlap one another along the top edge surface of the diaphragm plate 150. The side and bottom edges of the filter cloths 152 are fastened to one another by means of fasteners such as conventional self-locking cable ties 173. Each cable tie 173 is inserted into two corresponding eyelets 170 and the ends thereof are then locked together. This type of fastening of the filter cloths 152 allows the support handles 123 of diaphragm plate 150 to project outwardly between the opposed side edges of the filter cloths 152. Other types of fasteners may also be utilized to attach the opposed filter cloths 152 to one another.

With the filter cloths 152 mounted on the frame of plate 150, the cloths 152 are tented over their corresponding diaphragms 153 and a drainage area 181 (FIGS. 9 and 11) is formed by the array of projections 161 which define a network of flow channels behind each filter cloth 152.

As with the first embodiment, the present invention utilizes the above-discussed conventional cloth-type filter plates 17 along with the diaphragm plates 150. The plates 17 and 150 are preferably disposed in an alternating manner along the press 10, such that when the plates 17 and 150 are clamped together in the closed position as shown in FIG. 11, each adjacent pair of plates 17 and 150 forms a filter chamber 180 therebetween. Each filter chamber 180 is, in this embodiment of the invention, defined on one side by a filter cloth 152 of plate 150 and on the other side by a filter cloth 42 of plate 17.

In operation, the plates 17 and 150 are clamped together to form a continuous, longitudinally extending stack (FIG. 11). The peripheral edge frame 30 of plate 17 abuts the peripheral edge portion 70 of adjacent plate 150, and a seal is formed therebetween by means of the outer peripheral region 162 of the filter cloth 152 of plate 150 which is clamped between opposed adjacent plates 17 and 150 when the press 10 is closed. The peripheral region 162 serves to seal the corner flow passages during operation, and also prevents liquid within the filter cloth 152 from leaking out of the edges thereof. The operation of the second embodiment of the invention is the same as that of the first embodiment except that with the particular configuration of diaphragm plate 150 described above, liquid filtrate may exit from both sides of the filter chamber 180 formed between adjacent plates 17 and 150 by passing through the filter cloths 42 and 152 and into the elongated flow conduit formed by flow passages 55 and 121 of plates 17 and 150, respectively.

More specifically, as slurry is pumped into the press 10 liquid filtrate passes through the filter cloths 42 of plate 17 and is discharged as discussed above (i.e. the liquid enters the chamber 51 and is discharged through passages 52, 53 and 54 and the elongated flow conduit formed by flow passages 55 and 121 of plates 17 and 150, respectively, and to a filtrate vessel). The liquid filtrate also passes through the filter cloths 152 of plate 150, enters the drainage area 181 defined between the filter cloth 152 and the corresponding diaphragm 153, enters orifices 160 and flow passage 157 of projection 156, and is discharged through the elongated flow conduit formed by flow passages 55 and 121 to a filtrate vessel. Thus, liquid filtrate is drained from both sides of the filter chamber 180 and is discharged into a common flow conduit formed by flow passages 55 and 121 of plates 17 and 150, respectively. Further, during filling of the press 10, a vacuum is applied to chamber 94 so that the diaphragm 153 is pulled towards center partition 73 and the projections 161 fit over corresponding projections 82. This negative pressurization of the chamber 94 and the resulting seating of the diaphragm 153 on the central partition 73 ensures a maximum drainage area 181 between the filter cloth 152 and diaphragm 153 as the press 10 fills, since the drainage area 181 defined between the projections 161 could potentially be disrupted by deformation or flattening of the diaphragm 153 as the chamber 180 fills with solids.

A solid filter cake ultimately forms in each of the chambers 180 which forces the filter cloths 42 and 152 away from one another and inwardly towards the divider wall 33 and center partition 73 of each of the respective plates 17 and 150. The array of projections 41 on plate 17 and the array of projections 161 formed on diaphragm 153 of plate 150 provide for fluid flow even when the filter chambers 180 are full and the filter cloth 42 is pressed against the divider wall 33 and the filter cloth 152 is pressed against the diaphragm 153 and center partition 73. Further, if the filter chambers 180 are filled to the point that the diaphragm 153 is pressed tightly against the center partition 73 of plate 150, the diaphragm 153 conforms to the non-smooth surface (i.e. projections 82) of rear wall 81, to provide a maximum drainage area between the filter cloth 152 and the diaphragm 153, as discussed above.

When the press is filled with solids, filling of the press is stopped, and heated fluid is fed into the elongated flow conduit formed by the flow passages 103 and 66 of the respective plates 150 and 17 and into squeeze chambers 94 to pressurize same. The diaphragms 153 tend to flatten somewhat as they bulge outwardly due to pressure applied thereto which tends to reduce the volume of the drainage areas 181 between the cloths 152 and the opposed diaphragms 153. The filter cakes are thus squeezed and heated and moisture therefrom is removed by a vacuum applied to chamber 180 through the elongated flow conduit formed by flow passages 55 and 121 of plates 17 and 150, respectively. In this regard, the vacuum is applied and the moisture removed through the interstices of the filter cloths 152 which lie closely adjacent the corresponding diaphragms 153 during the squeeze cycle.

Examples of typical process parameters in accordance with this embodiment of the invention are as follows. Slurry is pumped into the press at 3 to 5% solids and practically all liquid passes through the filter cloth 42 of plate 17 and cloth 152 of plate 150 at a flow rate of about 0.1 GPM/ft$^2$ of filter cloth area. The pressure in chamber 180 is about 25 psig, the pressure in drainage area 181 is about 0 psig, and the pressure in chamber 94 is about minus 12 psig (effectively pulling the diaphragms 153 onto the center partition 73). During the squeeze cycle, chamber 94 is pressurized to about (100–225 psig), and the drainage flow rate through the filter cloths 42 and 152 decreases to about 0.01 GPM/ft$^2$ of filter cloth area. The above process parameters are presented only by way of example and are not limiting.

In accordance with an alternative embodiment of the invention, because the diaphragm plate 150 is adapted for permitting drainage of liquid filtrate, the diaphragm plates 150 may be utilized without the conventional cloth-type filter plates 17. In this embodiment, the diaphragm plates 150 are disposed along the press 10 such that when the plates 150 are clamped together in the closed position, each adjacent pair of plates 150 forms a filter chamber therebetween which is defined on both sides by the opposed filter cloths 152 of the two adjacent plates 150. In operation, the liquid filtrate passes through the filter cloths 152, enters the drainage areas 181, enters the orifices 160 and flow passages 157, and is discharged through the elongated flow conduit formed by the flow passages 121 of plates 150 to a filtrate vessel.

Although the cost associated with using diaphragm plates 150 without the conventional cloth-type plates 17 is higher than that of the previous embodiment which utilizes alternating diaphragm plates 150 and cloth-type plates 17, this increased cost is offset by the more efficient and uniform heat transfer that occurs between the heated fluid pumped into the squeeze chambers 94 and the filter cakes lodged in the filter chambers 180, which improved heat transfer is possible due to the thin and uniformly thick diaphragm according to the invention.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plate arrangement including a plurality of individual plates supported on and between said side rails for movement therealong between said first and second head assemblies, said plurality of plates being pushed together into a horizontally extending closed stack and clampingly held between said first and second head assemblies when said first head assembly is moved toward said second head assembly into said closed position, a plate shifting arrangement for effecting individual and sequential shifting of said plates from said closed stack along said side rails in said rearward direction toward said first head assembly when in the open position, comprising the improvement wherein:

said plurality of plates comprises a plurality of first plates each including a frame having a pair of oppositely disposed parallel faces, a peripheral edge portion surrounding a central portion having two sides which face away from one another and are recessed inwardly towards a central plane of said first plate with respect to said peripheral edge portion, said peripheral edge portion having first and second side surfaces facing away from one another and each defining therein a continuous groove, a first liquid impermeable membrane extending across one of said sides of said central portion to define a first pressure chamber therewith and a second liquid impermeable membrane extending across the other said side of said central portion to define a second pressure chamber therewith, each said first and second membrane having an outer periphery with a terminal edge engaged within a respective one of said grooves and fixed therein by an elastomeric retaining member which overlies the respective said membrane and holds said terminal edge thereof in said groove;

said plurality of plates comprises a plurality of second plates each including a frame having a pair of oppositely disposed parallel faces, a peripheral edge portion surrounding a central portion having two sides which face away from one another and are recessed inwardly towards a central plane of said second plate with respect to said peripheral edge portion of said second plate, a first liquid permeable filter member fixed to said frame of said second plate and extending across one of said sides of said central portion of said second plate to define a first drainage chamber therewith in fluid communication with a filtrate discharge passage, and a second liquid permeable filter member fixed to said frame of said second plate and extending across the other said side of said central portion of said second plate to define a second drainage chamber therewith in fluid communication with a filtrate discharge passage, each said second plate being free of liquid impermeable membranes; and said first and second plates being disposed in an alternating manner along said side rails in adjacent contact with one another in said closed position to define a filter chamber therebetween for filtering and collecting solids from a slurry entering said filter chamber, said first and second side surfaces each having an annular planar portion which extends from an outer perimeter of the corresponding said pressure chamber to the respective said groove, said outer peripheries of said first and second membranes respectively extending over said planar portions such that said outer peripheries are clamped between and in direct contact with said planar portions and the peripheral edge portions of the adjacent said second plates to seal therebetween in said closed position, the liquid portion of the slurry from said filter chambers penetrating said filter members of said second plates, entering said first and second drainage chambers and exiting said filter press via a filtrate discharge passage and the solid portion of the slurry remaining in said filter chambers, said first and second pressure chambers being in fluid communication with a fluid source to expand said first and second membranes toward an adjacent one of said first and second filter members and pressurize the slurry to facilitate liquid solid separation.

2. The filter press of claim 1 wherein said first and second pressure chambers are in fluid communication with a source of heated fluid to expand said first and second membranes toward an adjacent one of said first and second filter members and pressurize and heat the slurry to facilitate liquid solid separation, said first and second drainage chambers being connected to a vacuum source to remove vaporized portions of the slurry from said filter chambers.

3. The filter press of claim 1 wherein said first and second membranes comprise a uniform thickness throughout.

4. The filter press of claim 1 wherein said first and second membranes have a thickness between about 0.015 inches and about 0.040 inches.

5. The filter press of claim 1 wherein said first plates each comprise a first passage opening into said first and second pressure chambers, said first passage being in fluid communication with the fluid source for permitting entry of fluid into said first and second pressure chambers to expand each of said first and second membranes toward an adjacent one of said first and second filter members, and a second passage opening into said first and second pressure chambers for permitting discharge of the fluid from said first and second pressure chambers.

6. The filter press of claim 5 wherein said second plates each comprise a passage opening into said first and second drainage chambers, said passages of said second plates being in fluid communication with a filtrate discharge passage for permitting discharge of the liquid portion of the slurry from said first and second drainage chambers.

7. The filter press of claim 6 wherein said second plates each comprise an additional passage opening into its corresponding filter chamber in said closed position for feeding slurry into said filter chamber.

8. The filter press of claim 7 wherein each said first and second plate has a generally rectangular configuration defining four corner areas, each said corner area of said first and second plates defining therein a bore which extends completely through the respective said plate, the respective bores of said plates when in said closed position forming four separate elongate and generally horizontally extending conduits, a first of said conduits defining a fluid intake conduit which communicates with said first passages and the fluid source to supply fluid to said pressure chambers, a second of said conduits defining a fluid discharge conduit which communicates with said second passages to discharge fluid from said pressure chambers, a third of said conduits defining a slurry supply conduit which communicates with said additional passages of said second plates for feeding slurry into said filter chambers, and a fourth of said conduits defining said filtrate discharge passage which communicates with said passages of said second plates and said drainage chambers to discharge the liquid portion of the slurry.

9. The filter press of claim 1 wherein said membrane comprises a thin elastomeric material having a thickness of about 0.023 inches.

10. The filter press of claim 9 wherein said elastomeric material comprises neoprene with nylon fabric reinforcement.

11. The filter press of claim 1 wherein said terminal edge of each said first and second membrane is continuous and defines the outermost perimeter of the respective said membrane, and said first and second membranes when in a non-pressurized state each have a planar configuration as same extend between opposite diametrical points defined along the corresponding said retaining member.

12. The filter press of claim 1 wherein said peripheral edge portion of each said second plate has first and second side surfaces facing away from one another and each defining therein a continuous groove, each said first and second filter member having an outer periphery with a terminal edge engaged within one of said grooves of said second plate and fixed therein by an elastomeric retaining member which overlies the respective said filter member and holds said terminal edge thereof in said groove of said second plate, said first and second side surfaces of said second plate each having a planar area disposed adjacent the corresponding said groove of said second plate, each said planar area being disposed in juxtaposed face-to-face relation with said planar portion of said peripheral edge portion of the adjacent said first plate to clamp said outer periphery of the corresponding said membrane directly therebetween and seal between adjacent said first and second plates in said closed position.

13. The filter press of claim 12 wherein said first and second side surfaces of said peripheral edge portions of said second plates each define therein a transvesely opening channel, said channel and the opposed peripheral edge portion of the adjacent said first plate together defining a passage opening into the corresponding said filter chamber in said closed position for feeding slurry into said filter chamber.

14. The filter press of claim 1 wherein each said first plate is free of liquid permeable membranes such that the liquid portion of the slurry from said filter chambers drains solely through said second plates.

* * * * *